Patented Feb. 27, 1945

2,370,392

UNITED STATES PATENT OFFICE 2,370,392

HALOGENO-KETONES

William Robert Boon, Blackley, Manchester, England, assignor to Imperial Chemical Industries Limited, a corporation of Great Britain No Drawing. Application April 23, 1943, Serial No. 484,293. In Great Britain May 26, 1942

4 Claims. (Cl. 260—593)

This invention relates to the manufacture of halogeno-ketones and more particularly to the manufacture of 5-chloro-, 5-bromo- and 5-iodo-pentanone-2. These halogeno-ketones are useful as intermediates in the manufacture of synthetic organic medicinal substances.

I have found that 5-chloro-, 5-bromo- and 5-iodo-pentanone-2 can readily be made in good yield by a process which comprises causing 1-aceto-butyrolactone to react with the appropriate hydrogen halide which is introduced either in the form of a concentrated aqueous solution, or in the gaseous form. In the latter case the reaction is preferably, but not necessarily, carried out in presence of an inert non-aqueous liquid serving as solvent or diluent.

Thus for instance the reaction may be brought about by passing a stream of the gaseous hydrogen halide into a solution of 1-aceto-butyrolactone in, for example, acetic acid, ethanol or benzene, or by stirring 1-aceto-butyrolactone with a strong aqueous solution of hydrochloric, hydrobromic or hydriodic acid. When the aqueous acid is used, the reaction is conveniently carried out at the ordinary or only moderately elevated temperatures, for example, 0°–40° C.; if higher temperatures are used there is an increasing tendency for tarry matter to be produced. If the reaction is carried out by passing a stream of gaseous hydrogen halide into a solution of the aceto-butyrolactone in a non-aqueous solvent, then there appears to be less tendency to form tars and higher temperatures, for example 65°–90° C., can safely be used, and, indeed, are preferable.

The following examples, in which the parts are by weight, illustrate but do not limit the invention.

Example 1

A slow stream of gaseous hydrogen chloride is passed through a solution of 128 parts of 1-aceto-butyrolactone in 175 parts of glacial acetic acid at 80–85° C. for 5 hours. The gas stream is then stopped and the reaction mixture is poured into 1000 parts of water. The mixture is neutralised with sodium carbonate, and the 5-chloro-pentanone-2 is extracted with ether. The ether solution is dried over anhydrous sodium sulphate and the ether is distilled off. The residue is distilled at sub-atmospheric pressure, whereby there is obtained 5-chloropentanone-2 of B. P. 76° C. at 34 mm. pressure.

Example 2

96 parts of 1-aceto-butyrolactone and 340 parts of an aqueous 48% solution of hydrogen bromide are stirred together for 12 hours at 15–20° C. The reaction mixture is then diluted with 1000 parts of cold water, whereupon an oil separates out. This is extracted with ether and worked up by the method described in Example 1. It has B. P. 73–75° C. at 12 mm. pressure. This is 5-bromopentanone-2.

Example 3

If in the process of Example 2 instead of the 48% solution of hydrogen bromide there is used an equivalent amount of a saturated aqueous solution of hydrogen bromide, the reaction being carried out at 0° C. and the product being worked up as before, a considerably increased yield of 5-bromopentanone-2 is obtained.

Example 4

If in the process of Example 2 there is used instead of the aqueous 48% solution of hydrogen bromide, a corresponding quantity of an aqueous 57% solution of hydrogen iodide, there is similarly obtained 5-iodo-pentanone-2 in the form of an oil of B. P. 108–110° C. at 25 mms. pressure.

I claim:

1. Process for the manufacture of a compound of the group consisting of 5-chloro-pentanone-2, 5-bromo-pentanone-2 and 5-iodo-pentanone-2 which comprises causing 1-aceto-butyrolactone to interact with the corresponding hydrogen halide which is introduced in a concentrated form.

2. Process as claimed in claim 1 wherein gaseous hydrogen halide is used, the reaction being carried out at a temperature in the range 65°–90° C. and in presence of an inert, non-aqueous, liquid medium.

3. Process as claimed in claim 1 wherein a concentrated aqueous solution of the hydrogen halide is used, the reaction being carried out at a temperature in the range 0°–40° C.

4. Process for the manufacture of 5-halogeno-pentanone-2, wherein the halogen is a member of the group consisting of chlorine, bromine and iodine, which comprises reacting upon one mole of 1-aceto-butyrolactone with an excess over one mole of the corresponding hydrogen halide, in concentrated aqueous solution, and at a temperature not exceeding 40° C.

WILLIAM ROBERT BOON.